UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 906,367. Specification of Letters Patent. Patented Dec. 8, 1908.

Application filed June 13, 1907. Serial No. 378,875.

*To all whom it may concern:*

Be it known that we, OSCAR BALLY and HUGO WOLFF, doctors of philosophy and chemists, respectively a citizen of the Swiss Republic and a subject of the Grand Duke of Baden, and residing, respectively, at Mannheim and Ludwigshafen-on-the-Rhine, Germany, have invented new and useful Improvements in Anthracene Coloring-Matters, of which the following is a specification.

In the French Patent No. 6719, 9th addition to No. 349,531, is disclosed the fact that compounds containing a benzanthrone group, such for instance as benzanthrone itself, and benzanthrone quinolin, and derivatives of these compounds, can by treatment with a halogenizing agent be converted into halogen derivatives which contain the halogen wholly or partly in the benzanthrone ring. The treatment of the benzanthrone compound with a halogenizing agent is fully described in the said French patent.

In the U. S. Patent No. 818,336, we have claimed the production of coloring matters by treating halogen benzanthrones with caustic alkali. We have now discovered that on applying this process to the specific halogen benzanthrones described in the aforesaid French patent coloring matters are obtained which possess properties different to those of the coloring matters described and claimed in the said Patent No. 818,336.

The production of the coloring matter which we desire to be understood as claiming in the present specification can be carried out by heating the halogen benzanthrones described in the said French specification with caustic alkali either alone, or in the presence of a diluting agent, or of a solvent. Instead of caustic alkalies themselves, their alcoholates can be employed. The halogenated benzanthrone compounds used according to this invention differ from those described in Letters Patent No. 809,894 and used in the production of dyes according to Letters Patent No. 818,336, since the dyestuffs obtainable by treatment with caustic alkali are different in the two cases, those of the present invention yielding dyestuffs much more easily and the dyestuffs obtained produce dyeings which are more lustrous and have redder shades than those described in the aforementioned specifications. The same difference also exists between the dyestuffs produced according to the present invention and those obtainable by treating benzanthrone coloring matters with halogenizing agents as described in the specification of Letters Patent No. 837,775. The halogen benzanthrones obtainable by treating a benzanthrone compound with a halogenizing agent probably contain halogen in the benzanthrone ring and thus differ from the halogen benzanthrones obtained by condensing halogen anthracene compounds with glycerin. The production of coloring matters by heating a compound containing a benzanthrone group is claimed generically in Letters Patent No. 809,892 and we make no generic claim for the production of coloring matters from benzanthrones and for the coloring matters themselves; but we wish to claim specifically the coloring matters obtainable by treating with caustic alkali a halogen benzanthrone compound which can be obtained by treating a benzanthrone compound with a halogenizing agent. They are soluble in concentrated sulfuric acid giving green solutions and in nitrobenzene giving reddish violet solutions. They dissolve in alkaline hydrosulfite yielding blue vats which dye vegetable fiber substantively giving red-violet to blue shades.

The following examples will serve to illustrate further the nature of our invention and the method of carrying it into practical effect, but our invention is not confined to these examples. The parts are by weight.

Example 1. Heat together twenty (20) parts of caustic potash and from twenty (20), to twenty-five (25), parts of absolute alcohol until a thin fluid homogeneous melt is obtained and the temperature rises to one hundred and forty (140) degrees centigrade. Then add five (5) parts of chlorbenzanthrone prepared as described in Example 5 of the aforesaid French patent and heat for half an hour (30 minutes) at a temperature of one hundred and fifty (150) degrees centigrade. The chlorbenzanthrone dissolves at once with a blue color which gradually changes into red-violet. When the reaction is complete, dissolve the melt in hot water and complete the precipitation of the coloring matter by boiling the solution, or more rapidly by passing air through the solution. Then filter and wash with hot water. The coloring matter so obtained, which is free from chlorin, consists of a violet - black paste and when dry of a dark violet powder which is insoluble in water and dilute acids and alkalies. When purified it yields a green solution in concentrated sulfuric acid and the color does not change on the addition of boric acid. It is difficultly soluble in most organic solvents. It yields a red-violet solution with a brownish red fluorescence with nitrobenzene. It dissolves in alkaline reducing agents yielding a blue vat which colors cotton blue and these shades upon washing turn into a beautiful reddish violet of excellent fastness.

Example 2. Introduce three (3) parts of monobrombenzanthrone, prepared according to Example 1 of the aforesaid French patent, into a solution of six (6) parts of metallic sodium in fifty (50) parts of absolute alcohol, and heat in an oil bath for from three (3), to four (4), hours, at a temperature of from one hundred and twenty (120), to one hundred and thirty (130), degrees centigrade. Then dissolve the melt in hot water and work up as described in the foregoing Example 1. The product obtained is free from bromin and can scarcely be distinguished from that obtainable to the said foregoing example.

Example 3. If in the foregoing Example 2, the monobrombenzanthrone be replaced by dibrombenzanthrone of melting point two hundred and fifty-seven (257) degrees centigrade (obtainable as described in Example 4 of the aforesaid French patent), a coloring matter is obtained which, in the unpurified state, dissolves in concentrated sulfuric acid the solution being reddish brown. In the pure state, however, it yields a green solution in sulfuric acid and a reddish violet solution with a brown-red fluorescence in nitrobenzene. It also contains bromin. It yields, with alkaline reducing agents, a blue vat which colors cotton blue shades, these shades, on washing, becoming reddish violet, and upon drying in the air, becoming again blue.

Example 4. If in the foregoing Example 1, the chlorbenzanthrone be replaced by a dibrombenzanthrone described in Example 4 of the aforesaid French patent, the coloring matter obtained is free from bromin and appears to be identical with that described in the said Example 1.

Example 5. Mix five (5) parts of absolute alcohol with one hundred (100) parts of dry xylene, add gradually two (2) parts of metallic sodium and heat in a reflux apparatus in an oil-bath at a temperature of from one hundred and ten (110), to one hundred and twenty (120), degrees centigrade, taking care to prevent access of moisture or carbon dioxid to the apparatus. Hydrogen is evolved and the sodium is gradually converted into sodium alcoholate which is suspended in the xylene in a very finely divided gelatinous condition. When no more metallic sodium is present, add ten (10) parts of chlorbenzanthrone (prepared as described in Example 5 of the aforesaid French patent) and boil the whole until the formation of the coloring matter is complete. When the mass is cool, filter off the coloring matter and wash first with xylene, then with alcohol, and finally with water. The product obtained appears to be identical with that produced according to the foregoing Example 2.

Now what we claim is:

1. As new articles of manufacture the anthracene coloring matters which can be obtained by treating with caustic alkali a halogen benzanthrone compound obtainable by treating a benzanthrone compound with a halogenizing agent, which coloring matters dissolve in concentrated sulfuric acid, yielding green solutions and in nitrobenzene yielding reddish violet solutions and in alkaline hydrosulfite yielding blue vats which dye vegetable fiber substantively giving red-violet to blue shades.

2. As a new article of manufacture the anthracene coloring matter which can be obtained by treating with caustic alkali chlorbenzanthrone obtainable by treating benzanthrone with chlorin, which coloring matter yields a green solution in concentrated sulfuric acid, a reddish violet solution in nitrobenzene and with alkaline hydrosulfite yields a blue vat which dyes vegetable fiber substantively giving red-violet shades.

In testimony whereof we have hereunto set our hands in the presence of two subscribing witnesses.

OSCAR BALLY.
HUGO WOLFF.

Witnesses:
H. W. HARRIS,
J. ALEC. LLOYD.